United States Patent
Goj

(12) 
(10) Patent No.: US 6,405,983 B1
(45) Date of Patent: Jun. 18, 2002

(54) APPARATUS FOR ATTACHING LAMINAR OBJECTS TO A VERTICAL SUPPORT STRUCTURE

(76) Inventor: Jozef Goj, 3418 Singleton Rd., Colo Heights, NSW 2756 (AU)

( * ) Notice: Subject to any disclaimer, the term of this patent is extended or adjusted under 35 U.S.C. 154(b) by 0 days.

(21) Appl. No.: 09/591,766

(22) Filed: Jun. 12, 2000

Related U.S. Application Data

(63) Continuation-in-part of application No. 09/091,308, filed as application No. PCT/AU76/00185 on Dec. 5, 1996, now abandoned.

(30) Foreign Application Priority Data

Dec. 18, 1995 (AU) .............................................. PN 7202

(51) Int. Cl.$^7$ ............................. A47G 1/06; A47F 5/08; H01F 7/02
(52) U.S. Cl. ................................. 248/205.1; 248/205.5; 248/206.5; 248/309.4; 248/467; 335/302
(58) Field of Search .............................. 248/205.1, 467, 248/489, 205.5, 205.3, 205.7, 206.2, 206.5, 309.4; 335/302

(56) References Cited

U.S. PATENT DOCUMENTS

| | | | |
|---|---|---|---|
| 1,228,649 A | 6/1917 | Childs | 248/115 |
| 1,518,943 A | 12/1924 | Story | 248/205.5 |
| 3,027,795 A | 10/1958 | Spadaro | 411/372.5 |
| 3,109,619 A | 11/1963 | Krug et al. | 248/690 |
| 3,239,178 A | 3/1966 | Pompa | 248/205.3 |
| 3,245,165 A | 4/1966 | Podoloff | 40/591 |
| 3,338,293 A | 8/1967 | Hohmann | 160/370.21 |
| 3,365,684 A | * 1/1968 | Stemke et al. | 335/302 |
| 3,827,020 A | * 7/1974 | Okamoto | 335/285 |
| 4,258,493 A | * 3/1981 | Kettlestrings et al. | 40/600 |
| 4,265,002 A | 5/1981 | Hosken | 24/201 B |
| 4,367,995 A | 1/1983 | Mizusawa et al. | 411/57 |
| 4,607,875 A | 8/1986 | McGirr | 296/97.7 |
| 4,830,321 A | 5/1989 | Irie | 248/206.5 |
| 4,875,654 A | 10/1989 | Chandonnet et al. | 248/467 |

(List continued on next page.)

FOREIGN PATENT DOCUMENTS

| | | | |
|---|---|---|---|
| AU | 82165/87 | 6/1988 | F16B/13/14 |
| AU | 12846/92 | 4/1993 | A44B/17/00 |
| CA | 2020684 | 1/1992 | A47G/1/17 |
| DE | 2749054 | 5/1979 | F16B/13/06 |
| DE | 3224820 | 1/1984 | F16B/13/06 |
| EP | 0123366 | 10/1984 | F16B/13/06 |
| EP | 0284045 | 9/1988 | A44B/1/08 |
| FR | 2149609 | 3/1973 | A47G/3/00 |
| FR | 2611824 | 9/1988 | F16B/5/06 |
| GB | 1254926 | 11/1971 | H01F/7/02 |

(List continued on next page.)

Primary Examiner—Anita King
(74) Attorney, Agent, or Firm—Klein & Szekeres, LLP

(57) ABSTRACT

A device for attaching a laminar object such as a poster to a wall includes a plate having a rear face which is attachable to a wall and a boss which protrudes from a front face of the plate. The plate may include a layer of ferromagnetic material such as steel and may be attached to the wall by a plastic holding composite, a nail or pin or by adhesive. A hole may then be punched in a corner of a poster or other laminar object and that hole is placed over the boss which then supports the poster from the wall. A keeper which is may be made from a rubberized magnetic material and includes a through hole which is approximately the same size as the boss, is placed over the plate to retain the poster in place. Further weak magnetic attraction between the retainer and the ferromagnetic plate or an interference fit helps keep the retainer attached over the boss and retain the poster on the wall except in drafty conditions where the keeper releases the poster.

6 Claims, 2 Drawing Sheets

U.S. PATENT DOCUMENTS

| | | | | |
|---|---|---|---|---|
| 5,369,899 A | * 12/1994 | Reeves | ........................... | 40/1.5 |
| 5,370,484 A | 12/1994 | Morikawa et al. | ............ | 411/48 |
| 5,450,658 A | * 9/1995 | Hicks | ........................... | 24/303 |
| 5,895,018 A | 4/1999 | Rielo | ....................... | 248/206.5 |
| 5,949,050 A | * 9/1999 | Fosbenner et al. | ........... | 235/449 |
| 5,987,715 A | * 11/1999 | Khon | ........................... | 24/303 |

FOREIGN PATENT DOCUMENTS

| | | | | |
|---|---|---|---|---|
| GB | 1381286 | 1/1975 | ............ | F16B/13/14 |
| GB | 1425852 | 2/1976 | ............ | F16B/13/00 |
| GB | 2092433 | 8/1982 | ............. | A44B/1/28 |
| GB | 2222945 | 3/1990 | ............. | A47G/1/06 |
| GB | 2241036 | 8/1991 | ............ | F16B/13/14 |
| WO | 90/07885 | 7/1990 | ............. | A44B/1/30 |

* cited by examiner

APPARATUS FOR ATTACHING LAMINAR OBJECTS TO A VERTICAL SUPPORT STRUCTURE

CROSS-REFERENCE TO RELATED APPLICATION

This application is a Continuation-in-Part of application Ser. No. 09/091,308 filed Jun. 15, 1998, now abandoned, which is a 371 of PCT/AU96/00785 filed Dec. 5, 1996.

FIELD OF THE INVENTION

This invention relates to apparatus for attaching laminar paper sheets and the like to walls and the like.

BACKGROUND OF THE INVENTION

The present invention relates to the general field of hanging laminar paper sheets from a wall or surface. The paper may be in the form of a poster, a note, a notice, a wall chart, a yearly planner, a calender, a wall map, or a child's painting. Generally the invention relates to the support of any paper notice of any size that is put up either temporarily or permanently.

Traditionally, paper items such as posters have been attached to walls by means of drawing pins, plastic holding composites (such as those marketed under the trademark BLU-TAK), adhesive tape, and other more complex devices.

Attaching posters to walls by means of plastic holding composites is generally unsatisfactory. Posters attached to a wall by plastic holding composites tend to become stained by the plastic holding composite. Plastic holding composites become hard after a time and lose their stickiness. Often posters which are stuck to walls with plastic holding composites tear when they are taken down. In very hot weather, the composites can soften unduly and gravity may cause the poster to slip, and fall.

Single and double sided adhesive tape (such as the product sold under the trademark SELLOTAPE), are also commonly used to attach posters to walls. These tapes damage posters and leave a sticky residue that is hard to remove. When adhesive tape is removed from a poster, the poster is almost always torn and damaged. On some wall surfaces, the adhesive tape can remove the surface layer of the walls.

The other common method of attaching posters to walls is using thumb tacks, drawing pins or the like. These are mostly used on notice boards or for pinning a poster directly to a wall. Drawing pins do not work well with old walls or walls that are not firm. In drafty conditions, depending on the firmness of the wall, the pin may often fall out or the poster may rip and fall or both. When drawing pins become dislodged and fall to the floor, they often land with the pin up and can cause injury. If posters are repeatedly pinned on a wall, the wall may become pin cushioned with many holes.

When these methods are used to hang posters and notices, the walls on which the notices are hung become damaged and posters and notes are generally discarded as they have become stained and torn. The damage to walls is considerable, causing expensive redecorating costs.

Although these methods of hanging posters are used they do not allow the easy changing of posters. They do not allow posters to be reused as they are usually damaged. They damage and mark the surfaces where they are put up. Therefore an object of the invention is to provide an improved poster hanging device.

One major problem with hanging posters and the like to wall surfaces arises in the event of drafts and currents of air (wind). Depending on the wind angle and strength, when posters are mounted to walls, the poster tends to stretch between the mounting points and lifts from the wall placing stress on the mounting points. If the wind is of sufficient force, the poster tends to fly off the wall. If the poster has been mounted to the wall with drawing pins, the drawing pins either stay in and rip the corners off the poster or fly out with the poster and as discussed above, may land with the pin up and cause injury. When the poster is mounted with a plastic holding composite and caught in the draft, often the composite stays on the wall and the poster comes away from the wall leaving a layer of the poster attached to the composite, thereby delaminating and damaging the poster.

Various prior art devices have been proposed in the past for attaching objects to walls. U.S. Pat. No. 4,875,564 (Chandonnet) describes a device suitable for mounting rigid objects to walls such as framed pictures and the like. The device is wholly unsuited to attaching sheets of paper to walls as the holding device is attached to the rear of the object so that the object hung must be rigid for the device to function. The device cannot carry advertising, is not essentially reusable and would not release under wind-loading.

U.S. Pat. No. 3,245,165 (Podoloff) is concerned to applying signs to metal structures such as delivery vans. The device requires a ferromagnetic surface to apply the sign against to work properly. The sign is held onto the attaching device of U.S. Pat. No. 3,245,165 by means of a nut threaded onto a screw and would not automatically release under wind loading.

U.S. Pat. No. 1,228,649 (Childs) discloses a double suction cup which is wholly unsuited to attaching laminar paper objects to walls and cannot carry advertising.

U.S. Pat. No. 4,265,002 (Hosken) discloses magnetic fastening means for clothing which is designed to replace buttons, fasteners and the like which are not suited to attaching objects to walls and which would not release under wind loading.

U.S. Pat. No. 3,239,178 (Pompa) discloses a magnetic and adhesive mounting support in which a first magnet is mounted to a wall and a second magnet is mounted to the rear of an article. The apparatus is complicated and expensive. The mounting support is only suitable for relative rigid objects and is non reusable and expensively designed. The mounting does not provide an advertising facility.

U.S. Pat. No. 3,338,293 (Hohmann) discloses a windshield protection device including a series of suction cups which fit to a windscreen on which is mounted a windshield cover. The device is designed to lock the windshield cover to the windshield and the resiliently deformable attaching members which are not suited to carrying advertising and would not release under wind loading.

U.S. Pat. No. 3,027,795 (Spadaro) discloses a connector for hanging wall mirrors or the like to a wall which mounts the mirror directly against the wall and would not release the mirror under drafty conditions.

An object of the present invention is to alleviate several of the disadvantages of the prior art discussed and provides the public with a method that allows anyone to place posters and the like onto any suitable wall surface such as plaster, plaster board, gyprock, concrete, timber, glass and the like.

It is a further object of the invention to cause minimum damage to the surface when placed on that surface and to allow posters to be changed easily and simply, particularly where standard sized sheets of paper are used.

It is a yet further object of the invention to provide a device for hanging posters and the like which is designed so that posters are not torn if they are placed in those areas where drafts may remove the poster from the wall.

It is a further object to provide a device which keeps the poster off the wall allowing the paper to breath which prevents the paper from becoming damp and allows it to dry off if it does become damp.

The present invention seeks to provide devices for attaching objects to walls or the like which alleviate some of the above-mentioned disadvantages of known existing devices.

SUMMARY OF THE INVENTION

Thus, in a first aspect of the invention there is provided a device for attaching a laminar paper object having an aperture to vertical support structure such as a wall, the device comprising:
- a plate defining a first face and a second face, the first face of the plate being attachable to a vertical structure the second face being generally planar, except for a boss having a diameter of 4 mm or greater protruding from the second face of the plate the boss being dimensioned to be received in the aperture and wherein the boss is non-threaded; and
- a flexible generally planar retaining means configured to receive the boss.
- wherein one of said plate or said retaining means includes or is made of a ferrous material and the other of the plate and the retaining means includes or is made of a relatively weak ferromagnetic material, so that the retaining means, plate, and boss co-operate, by means of relatively weak magnetic attraction between the retaining means and the plate, to retain the laminar paper object located between the plate and the retaining means in a fixed location relative to the plate and retaining means, whereby the laminar object may be supported from the boss by means of the aperture, and retained there by the retaining means, but wherein when the laminar paper object is pivoted about the device, the retaining means flex with the laminar paper object and lift from the plate thereby releasing the laminar paper object.

In a related aspect of the invention, there is provided a device for attaching a laminar paper object having an aperture to a vertical support structure such as a wall, the device comprising:
- a plate defining a first face and a second face, the first face of the plate being attachable to a vertical structure, the second face being generally planar except for a boss protruding from the second face of the plate and dimensioned to be received in the aperture wherein the boss has a diameter of 4 mm or greater and the boss is non-threaded; and
- a flexible generally planar retaining means defining a second aperture which is configured to receive the boss in a relatively weak interference type fit; wherein
- the laminar paper object may be located between the plate and the retaining means in a fixed location relative to the plate and retaining means whereby the laminar object may be supported from the boss by means of the aperture and the retained there sandwiched between the second face of the plate and the planar retaining means but wherein when the laminar paper object is pivoted about the device the retaining means will flex, disengage from the boss and release the laminar paper object.

Thus the present invention provides a device which firstly provides a relatively large diameter boss which supports the laminar paper object and is of sufficient diameter that the poster does not tear in normal use as it provides a greater support area for the poster than, say, a drawing pin or tack. In light wind, the retaining means provides backing to the poster which is sandwiched between the planar keeper and the planar second face and prevents the laminar paper object from tearing as it spreads the force of the wind acting on the paper. However, the retaining means is designed to lift in relatively windier or draftier conditions. Posters usually flap or curve into a wave shape in windy conditions which often generates a vibration effect at the points where the poster is mounted to a vertical surface. The vibration will cause the poster to be lifted in small increments until sufficient movement causes the flexible retaining means to lift sufficiently to release the laminar paper object. The retaining means will flex and then lever off the device as it pivots against the edge opposite the lifting force of the wind.

Typically, the surface area of the generally planar second face is at least 500 mm$^2$ and preferably about 800 mm$^2$ or more.

Typically, the surface area of the retaining means is at least 500 mm$^2$ preferably 800 mm$^2$ and most preferably around 1200 mm$^2$ or more.

Typically, the boss will be cylindrical having a diameter of between 5 to 6.5 mm, most preferably about 6 mm.

In one embodiment the plate includes a washer made of a ferrous material disposed on the plate around over the boss, and the retaining means is a rubberised magnetic material, such as is commonly used for fridge magnets. Alternatively, the plate may be ferromagnetic, and the retaining means may be ferrous.

Conveniently, the plate may be generally circular in plan view.

The plate may be attached to a wall be means of a plastic holding composite such as that marketed under the trade mark "Blue-tak®" or a similar product such as glue or the like, or the plate may define a sucker, which is particularly useful for attaching the device to windows, mirrors and the like.

The device provides the public with a device that allows anybody to place posters onto any surface, such as plaster, plasterboard, gyprock, brick, concrete, timber, glass etc.

It causes minimal damage to the surface when placed on that surface. The device allows posters and the like to be changed easily and simply particularly where standard size sheets of paper are used.

The device keeps the poster off the wall allowing the paper to breathe. It will not become damp and if it does it will dry off.

The device will stretch the poster between fixing points irrespective of how many are used. As it carries a greater loading capacity the posters "present" in a flatter way.

The retaining means/keeper may be used to promote advertising.

The device enables a user to place personalised individual notices on walls.

The plate may be manufactured in almost any material. A plastic moulding would be one suitable material. The plastic plate may be moulded in any colour so it may blend in with the wall colour and decor.

When the plate is used with plastic holding composites for temporary notices and these are sandwiched between the wall and the device, the device prevents contact of the composite with the notice. Furthermore, in hot conditions the device does not slip down the wall as the heat is prevented from penetrating to the compound by the plate. Paper notices that are in contact with these compounds allow the heat to penetrate through the paper to the composite.

Posters may be hung on the device without a keeper but are easily blown off without the keeper in position.

The plate may be attached to the wall by any standard means such as glue, screws, pins, nails or the like. The keeper may include gripping means located on the exterior surface of the keeper to assist in push fitting the keeper over the boss and in removal of the keeper. The device may be arranged so that a special tool is required for removal of the keeper.

The embodiments of the invention described above have the advantage of a lack of any sharp protuberances such as hooks projecting into a living space, and that the object retained between the plate and the retaining means is securely held by the co-operation of the retaining means and the plate.

The plate and boss may be incorporated into a wall during construction of a building.

BRIEF DESCRIPTION OF THE DRAWINGS

Preferred embodiments of the present invention will now be described by way of example only and with reference to the accompanying drawings in which.

DETAILED DESCRIPTION OF THE INVENTION

Figure 1:
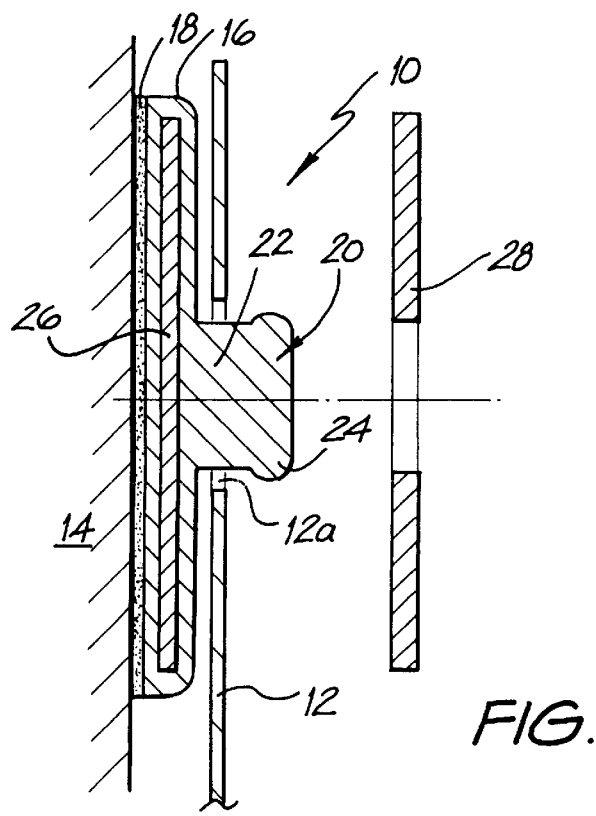
FIG. 1 shows a cross-section through a first embodiment of a device for attaching posters or the like to a wall.

Referring to the drawings, FIG. 1 shows a device generally indicated at 10 for attaching a poster 12, or other similar light weight laminar paper object to a wall 14. The device includes a planar plate 16 which is attached to wall 14 by means of an adhesive coating 18. In plan view the plate is generally circular and has a diameter of 32 mm, and an area of about 800 mm². An integral boss 20 which includes a generally cylindrical non-threaded portion 22 and an enlarged end portion 24 extends from and is integrally moulded with the plate. Inside the plate 16 there is located a ferrous plate 26. The device also includes an annular, or washer shaped, flexible planar magnetic retention device 28, which has a surface area of about 800 mm² and is preferably formed from a rubberised magnetic material such as is used for fridge magnets.

In use, four holes 12a which are approximately the same size as the enlarged portion 24 of the boss are made in each of the four corners of the poster 12. Ideally, these holes are set in the same distance in from each edge of the corner. More holes may be used if required for very large posters.

This poster then becomes the template for positioning the devices on a all. Posters that are irregularly shaped can be put up just as easily as they are he template for the fixing device.

The devices 10 are then pinned (glued, stuck, bonded) to the wall depending on how long it is intended that the devices are to stay up.

As the device has been aligned to the poster, where posters are of the same size they may be easily changed or removed and the poster is hung from the boss by means of a hole 12a. The magnetic plate is then also placed over the boss and magnetic attraction between the retention part and the plate holds the poster securely between the plate and the retention part. The hole in the centre of the retention device 28 may be slightly smaller than the boss 20 so that the device 28 is also held in place by friction, in an interference type fit.

Instead of an adhesive coating, the plate could be attached to the wall by any suitable means such as screws, nails, pins, tacks hook and loop fasteners, double sided sticky tape, or the like. The plate and boss could be made of any suitable material. The plate 26 could be magnetic and the retention part could be made of a ferrous material.

Figure 2:
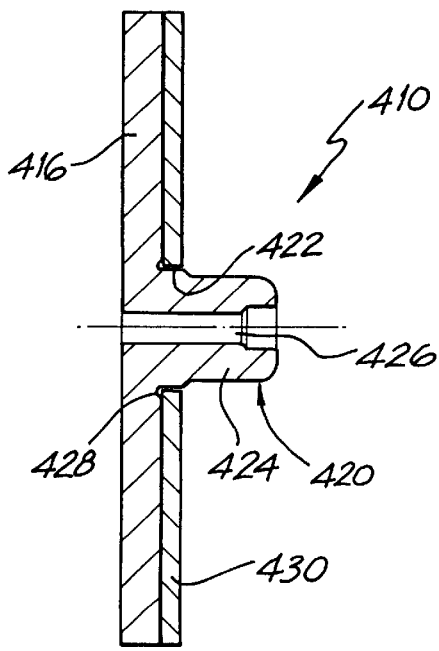
FIG. 2 shows a cross-section through a second embodiment of a device for attaching posters or the like to a wall.
Figure 3:
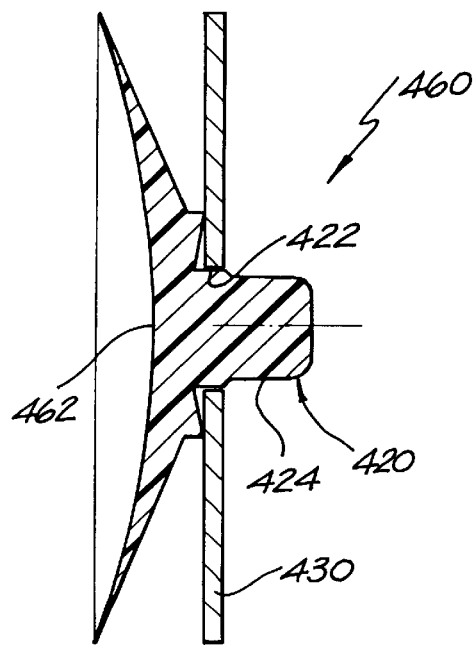
FIG. 3 shows a cross-section through a third embodiment of a device for attaching posters or the like to a wall.
Figure 4:
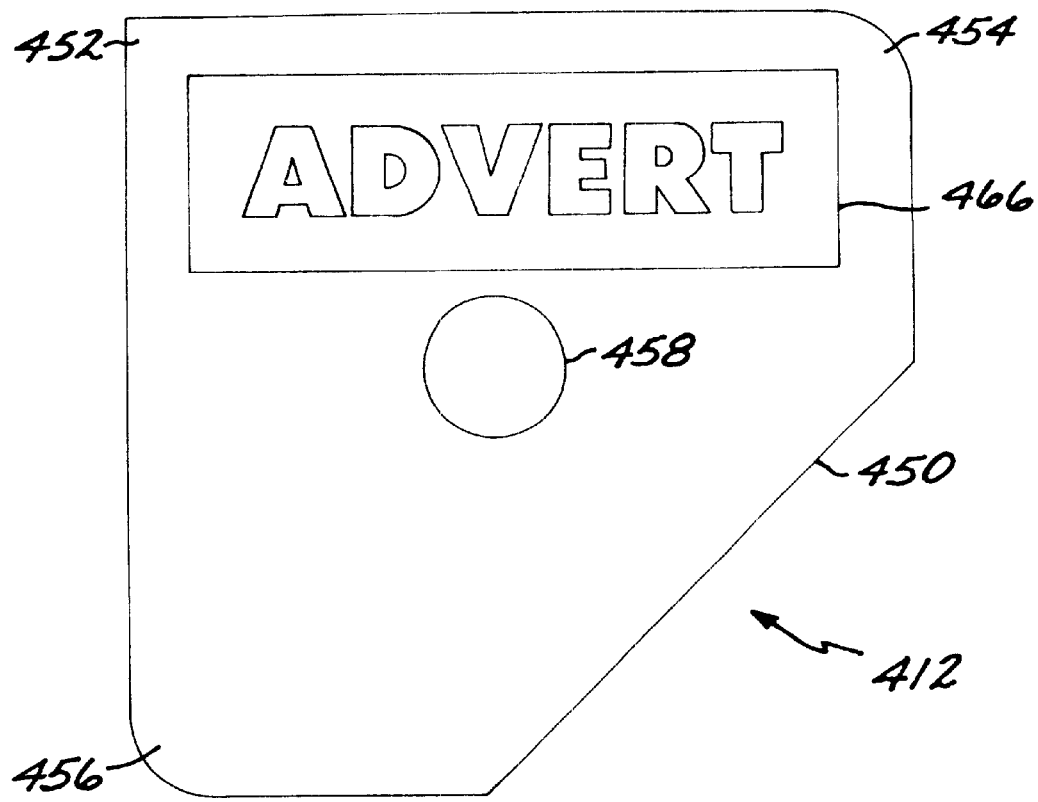
FIG. 4 shows a retaining means adapted for co-operation with the devices shown in FIGS. 2 and 3.

Related devices to the device shown in FIG. 1 are shown in FIGS. 2 to 4. Referring to FIG. 2, the device 410 includes a plate 416 which is circular in plan view and whose diameter is 32 mm. A boss 420 which is integrally moulded with the plate defines a first generally cylindrical portion 422 having a diameter of 6.0 mm and a second generally cylindrical portion 424 of a slightly narrower diameter of 5.8 mm. A cylindrical hole 426 extends through the centre of the boss and plate: the major portion of the hole has a diameter of 1.3 mm, however, the end of the hole distal from the plate 410 has an enlarged diameter of 1.8 mm.

A channel 428 having a width of 0.5 mm and a depth of 0.2 mm extends around the base of the boss 420 where the boss joins the plate. Above the plate and channel a zinc anodised steel washer 430 having a diameter of 6.0 mm and defining a central hole of 6.0 mm diameter is push-fitted, or alternatively glued, onto the first cylindrical portion 422 of the boss. The channel 428 is provided in case there are any burrs on the washer caused in the manufacturing of the washer.

FIG. 4 shows a retaining plate 412. The plate is generally rectangular but one triangular corner portion 450 is cut-out, the corner 452 opposite the cut-out portion being angular and the two other corners 454, 456 being rounded. The surface area of the retaining plate is 1400 mm². If the retaining plate is to be retained on the device 410 by means of magnetic attraction between the retaining means and the steel washer 430, then the retaining plate is made of magnetic material dispersed in a rubber-like material of the type which is typically used to make fridge magnets. In this case, the aperture 458 in the retaining means may be larger than the diameter of the boss 420. Alternatively, the retaining plate 412 may be simply made of a relatively flexible plastics type material and be an interference fit on the boss 420 in which case, the diameter of the hole 458 is made slightly smaller than the diameter of the boss 420.

In use, the device 410 is attached to a wall by a plastic holding composite, glue or other suitable means. If additional strength is required, a nail extending through the hole 426 is used. A hole is punched in a poster or the like and the poster is hung from the wall by means of the boss extending through the hole, with the retaining plate 412 and in particular magnetic attraction between the washer 430 and the retaining plate 450 securing the poster in position. For aesthetic reasons the angular corner 452 of the plate can be aligned with a corner of the poster.

The boss 420 supports the poster. The edge of the aperture of the poster in engagement with the boss provides a large surface area to hold up the poster compared with say a drawing pin. The retaining means provides only limited grip against the surface of the poster whether relying weak on magnetic attraction or a relatively weak interference fit, but is sufficient to retain the poster in position in normal conditions or light drafts. The retaining means which has a relatively large surface area prevents the paper from tearing as it spreads the force of any wind acting on the paper and in effects, supports the paper as it is lifted by the action of any wind and acts a backing to the paper. Posters usually flap or curve into a wave shape in windy conditions, thus if the strength of the wind increases, a vibration effect will occur between the devices where the poster is mounted to the wall. The vibration causes the poster to be lifted. As one side of the poster is lifted, it also lifts one edge of the retaining means which flexes to some degree and then levers off the device as it pivots against its edge opposite to the lifting force of the wind. Thus the poster is released without damage.

FIG. 3 shows an embodiment similar to that shown in FIG. 2, but in which the device 460 includes a sucker 462 so that the device may be removably attached to a window, mirror or the like. The device including the sucker and the boss can be molded out of a rubber compound.

The suction cup version allows individual posters or notices to be placed on surfaces such as glass. For instance a shopkeeper may wish to show or promote a special and may make their own poster promoting one product to the street and another inside the shop. Two posters may be used back to back and provided they are the same size they may be totally different in content.

In a preferred embodiment, the retaining plate 412 carries a design, such as an advertising logo 466 or the like. The retaining plate may be any suitable shape and may be made in the shape of a particular manufacturer's logo.

In the above described embodiments which describe attaching plates to walls in the manner in which the plate is held to the wall is not significant and could include built in pins, screws, nails or gluing the plate to the wall. The rear surface of the plate may be coated with an adhesive and covered with a peel-off backing layer.

Although all the above embodiments describe attaching laminar objects to walls, it would be obvious to the skilled man that the invention could be adapted to attach objects to floors, ceilings or other objects.

What is claimed is:

1. A device for attaching a laminar paper object having an aperture to a vertical support structure, the device comprising:

a planar plate defining a first face and a second face, the first face of the plate being attachable to a vertical structure, the second face being generally planar, except for a boss having a diameter of 4 mm or greater protruding from the second face of the plate, the boss being dimensioned to be received in the aperture, and wherein the boss is non-threaded; and a flexible, generally planar retaining means defining an aperture configured to receive the boss;

wherein the plate is made of a plastic material and includes a ferrous washer disposed around the boss, and wherein the retaining means includes or is made of a ferromagnetic material, so that the retaining means, the plate, and the boss cooperate, by means of magnetic attraction between the retaining means and the plate, to retain the laminar paper object located between the plate and the retaining means in a fixed location relative to the plate and the retaining means, whereby the laminar object may be supported from the boss by means of the aperture, and retained there by the retaining means, but wherein when the laminar object is pivoted about the device, the retaining means flex with the laminar paper object and lift from the plate, thereby releasing the laminar paper object.

2. The device as claimed in claim 1 characterized in that the retaining means comprises a rubberized magnetic material.

3. A device as claimed in claim 1 characterized in that the first face of the plate defines a sucker for attaching the device to the vertical support structure.

4. A device as claimed in claim 1 characterized in that the plate defines a through bore configured to receive a nail or a tack to attach the plate to the support structure.

5. A device as claimed in claim 1 wherein the retaining means has a surface area of 500 mm$^2$ or greater, and wherein the second face of the plate has a surface area of 500 mm$^2$ or greater.

6. A device as claimed in claim 1 wherein the retaining means displays an advertisement or logo.

* * * * *